United States Patent
Kawamoto (10) Patent No.: US 8,488,199 B2
(45) Date of Patent: Jul. 16, 2013

(54) IMAGE OUTPUT INSPECTION SYSTEM, IMAGE INSPECTION APPARATUS, AND COMPUTER PROGRAM PRODUCT

(75) Inventor: Hiroyuki Kawamoto, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 287 days.

(21) Appl. No.: 12/926,828

(22) Filed: Dec. 13, 2010

(65) Prior Publication Data

US 2011/0141526 A1    Jun. 16, 2011

(30) Foreign Application Priority Data

Dec. 14, 2009  (JP) ................................. 2009-282988
Nov. 15, 2010  (JP) ................................. 2010-254816

(51) Int. Cl.
*H04N 1/405*     (2006.01)
*H04N 1/60*     (2006.01)
*G06K 9/00*     (2006.01)
*G06K 9/36*     (2006.01)

(52) U.S. Cl.
USPC .......... 358/3.06; 358/1.9; 358/3.26; 382/112; 382/167; 382/232; 382/260; 382/304

(58) Field of Classification Search
USPC ................. 358/1.9, 3.06, 3.26; 382/112, 167, 382/232, 260, 304
See application file for complete search history.

(56) References Cited

U.S. PATENT DOCUMENTS 7,724,922 B2 * 5/2010 Furukawa et al. ............. 382/112
2004/0179717 A1 * 9/2004 Furukawa et al. ............. 382/112

FOREIGN PATENT DOCUMENTS

| JP | 06-229941 A | 8/1994 |
| JP | 3836107 A | 8/2005 |
| JP | 3836107 B2 | 8/2005 |

OTHER PUBLICATIONS

English language abstract for JP-2005-205661 which corresponds to JP-3836107-A, downloaded from searching PAJ Oct. 19, 2010.

* cited by examiner

*Primary Examiner* — Charlotte M Baker
(74) *Attorney, Agent, or Firm* — Harness, Dickey & Pierce, P.L.C.

(57) ABSTRACT

An image-output inspection system includes a printer controller that generates output image data subjected to halftone processing in accordance with an input image forming condition specified in a printer language, an image output device that forms an image on an image output medium on the basis of the output image data, and transmits the output image data, an image reader that reads the image output medium, and generates read image data, and an image inspection apparatus that is connected to the image output device, and generates correct image data by restoring image data before subjected to the halftone processing from the output image data, and determines whether a print state of the image output medium is good or not by comparing the correct image data with the read image data.

13 Claims, 7 Drawing Sheets

IMAGE OUTPUT INSPECTION SYSTEM, IMAGE INSPECTION APPARATUS, AND COMPUTER PROGRAM PRODUCT

CROSS-REFERENCE TO RELATED APPLICATIONS

The present application claims priority to and incorporates by reference the entire contents of Japanese Patent Application No. 2009-282988 filed in Japan on Dec. 14, 2009 and Japanese Patent Application No. 2010-254816 filed in Japan on Nov. 15, 2010.

BACKGROUND OF THE INVENTION

1. Field of the Invention

The present invention relates to an image-output inspection system, an image inspection apparatus, and a computer program product.

2. Description of the Related Art

In most of large-scale printer systems and printing press systems, a printer controller for generating a printer image is installed in a different housing from that of a print output device or a printer and placed at a position away from the print output device or printer. With regard to a format of image data transmitted from the printer controller to the print output device, there are two methods, one method transmits CMYK multi-valued bitmap data (for example, 8-bit data) and another method transmits CMYK bitmap data subjected to halftone processing (for example, 2-bit data). A data amount of CMYK bitmap data subjected to halftone processing is smaller than a data amount of CMYK multi-valued bitmap data, and hence, transfer processing load is reduced by using the method transmitting CMYK bitmap data subjected to halftone processing.

Meanwhile, there is a known inspection apparatus that inspects a print state of a print output medium and determines whether the print state of the medium is good or not. In general, such an inspection apparatus is added to an image forming apparatus as an optional extra, to form a part of an image-output inspection system. Conventional inspection apparatuses for inspecting a print job improve accuracy of inspection by, for example, treating multi-valued CMYK bitmap data subjected to raster image processing (RIP), in Which bitmap expansion is performed on the basis of a printer language, as a correct image data, as in a technology disclosed in Japanese Patent No. 3836107.

However, when the bitmap data subjected to halftone processing is employed to facilitate a transfer process as described above, an inspection apparatus added as an optional extra can use only bitmap data of a small amount subjected to halftone processing even though it is preferable to use multi-valued data which is not subjected to halftone processing.

Namely, CMYK 2-bit data subjected to halftone processing is data subjected to dithering, and it is difficult to accurately compare the position of each halftone dot of correct image data for inspection with the position of each halftone dot of data read by an image reader. Consequently, using CMYK 2-bit data subjected to halftone processing as correct image data for inspection makes it difficult for the inspection apparatus to perform an accurate inspection.

SUMMARY OF THE INVENTION

It is an object of the present invention to at least partially solve the problems in the conventional technology.

According to one aspect of the present invention, an image-output inspection system includes a printer controller that generates output image data subjected to halftone processing in accordance with an input image forming condition specified in a printer language, an image output device that forms an image on an image output medium on the basis of the output image data, and transmits the output image data, an image reader that reads the image output medium, and generates read image data, and an image inspection apparatus that is connected to the image output device, and generates correct image data by restoring image data before subjected to the halftone processing from the output image data, and determines whether a print state of the image output medium is good or not by comparing the correct image data with the read image data.

Further, according to another aspect of the present invention, an image inspection apparatus is connected to an image output device which forms an image on an image output medium on the basis of output image data subjected to halftone processing in accordance with an input image forming condition specified in a printer language and transmits the output image data. The image inspection apparatus includes a restoring unit that generates correct image data by restoring image data before subjected to the halftone processing from the output image data, and an image comparing unit that determines whether a print state of the image output medium is good or not by comparing the correct image data with read image data generated by an image reader for reading the image output medium.

Still further, according to still another aspect of the present invention, a computer program product includes a computer-usable medium having computer-readable program codes embodied in the medium for causing a computer connected to an image output device, which forms an image on an image output medium on the basis of output image data subjected to halftone processing in accordance with an input image forming condition specified in a printer language and transmits the output image data, to execute generating correct image data by restoring image data before subjected to the halftone processing from the output image data, and determining whether a print state of the image output medium is good or not by comparing the correct image data with read image data generated by an image reader for reading the image output medium.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an image-output inspection system, an image inspection apparatus, and a computer program product are explained in detail below with reference to the accompanying drawings.

First Embodiment

Figure 1:
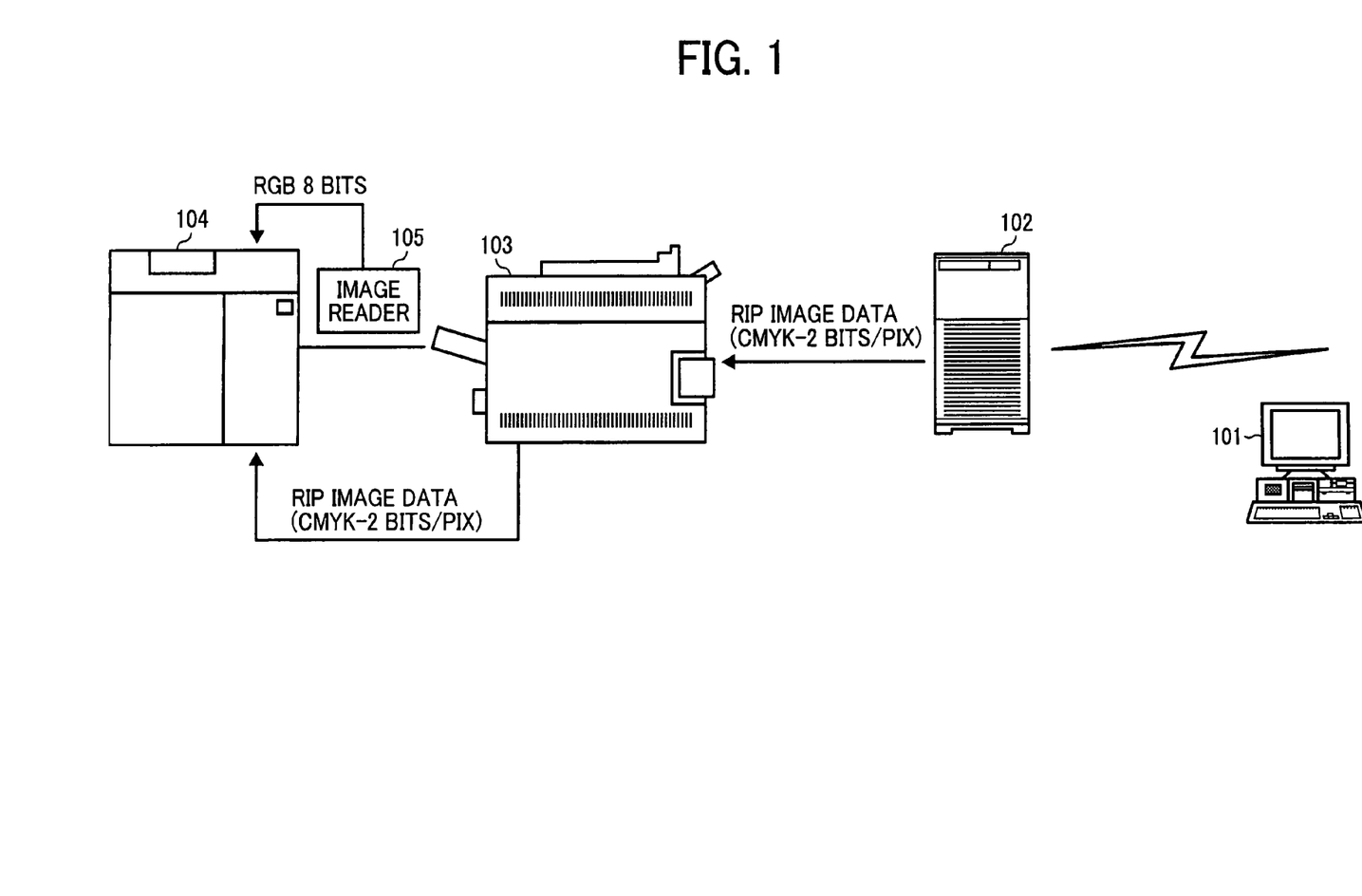
FIG. 1 is a configuration diagram of an image-output inspection system according to a first embodiment.

FIG. 1 is a configuration diagram of an image-output inspection system according to a first embodiment. As shown in FIG. 1, the image-output inspection system according to the present embodiment includes a client PC 101, a print server DFE (Digital Front-End) 102 corresponding to a printer controller, a printer 103 corresponding to an image output device, an image inspection apparatus 104, and an image reader 105. The client PC 101, the print server DFE 102, the printer 103, and the image inspection apparatus 104 are connected to one another by a network. The image reader 105 is connected to the image inspection apparatus 104 by wired or wireless connection. The print server DFE 102 is usually installed to be away from the printer 103 and the image inspection apparatus 104.

When the client PC 101 issues a print instruction, the print server DFE 102 analyzes a printer language and draws an image, and eventually generates a bitmap image corresponding to the number of output bits which the connected printer 103 can receive. In the present embodiment, the print server DFE 102 performs halftone processing on 8-bit data and generates a 1200 dpi CMYK 2-bit RIP image, and transfers the RIP image data to the printer 103.

The printer 103 outputs an image output medium on which an image is formed on the basis of the RIP image data. The image output medium is read by the image, reader 105 connected to the image inspection apparatus 104. As the image output medium, a paper medium as well as any printable media, such as fabric and plastic, can be used.

Furthermore, the printer 103 transmits 2-bit bitmap image data subjected to halftone processing (2-bit RIP image data) to the image inspection apparatus 104. Namely, the 2-bit RIP image data output from the printer 103 is restored to 8-bit bitmap data before being subjected to the halftone processing by a restoration device included in the image inspection apparatus 104 to be described later. Then, the image inspection apparatus 104 performs an inspection of a print state of the image output medium by comparing the RIP image data with read image data read by the image reader 105. The print state here means a state whether image data subjected to halftone processing is properly printed on a predetermined medium. For example, the print state collectively means print states of color, the glossiness, the line thickness, the density, toner drop, and the like.

Figure 2:
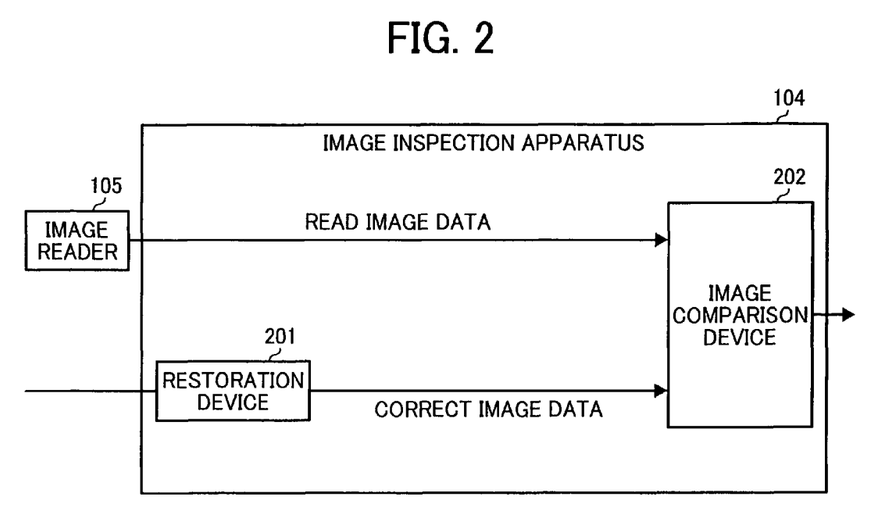
FIG. 2 is a block diagram illustrating a functional configuration of an image inspection apparatus according to the first embodiment.

FIG. 2 is a block diagram illustrating a functional configuration of the image inspection apparatus 104 according to the first embodiment. As shown in FIG. 2, the image inspection apparatus 104 according to the present embodiment mainly includes a restoration device 201 and an image comparison device 202. The restoration device 201 generates (restores) correct image data, an 8-bit image, before being subjected to halftone processing, from a 2-bit image subjected to the halftone processing.

In the present embodiment, a smoothing filter is used as the restoration device 201. Through a process performed by the smoothing filter, i.e., the restoration device 201, a pixel value "00" of 2-bit RIP image data is made to correspond to a pixel value "0" of 8-bit RIP image data, and a pixel value "11" of 2-bit RIP image data is made to correspond to a pixel value "255" of 8-bit RIP image data, for example. By performing the same process-on pixel values "01" and "10" of 2-bit RIP image data, the pixel value "01" of the 2-bit RIP image data is made to correspond to a pixel value "86" of 8-bit RIP image data, and the pixel value "10" of the 2-bit RIP image data is made to correspond to a pixel value "170" of 8-bit RIP image data. Then, the restoration device 201 generates 8-bit RIP image-data of a pixel value of 43, using an average of "0" and "86" respectively corresponding to "00" and "01", and generates 8-bit RIP image data of a pixel value of 128, using an average of "86" and "170" respectively corresponding to "01" and "10", in the same manner.

The image comparison device 202 compares correct image data, which is the generated 8-bit RIP image data, with read image data, an 8-bit image, transmitted from the image reader 105 which has read a printed image on an image output medium, and determines a print state of the image output medium (for example, the density and the presence or absence of image defect (such as toner drop of a text)).

In this manner, in the present embodiment, RIP image data subjected to halftone processing is restored to RIP image data before being subjected to the halftone processing by the restoration device 201 (for example, a smoothing filter), and therefore correct image data can be accurately generated by a small amount of calculation. Consequently, in the present embodiment, a print state of an image output medium is inspected by comparing such correct image data with read image data, and therefore it is possible to achieve a highly accurate inspection.

First Variation

To inspect an image output medium output from the color printer 103, it is necessary to match color space of correct image data with that of an image of read image data. Namely, to make the image comparison device 202 compare two image data, it is necessary to convert the image data so that the two image data are in the same color space.

Figure 3:
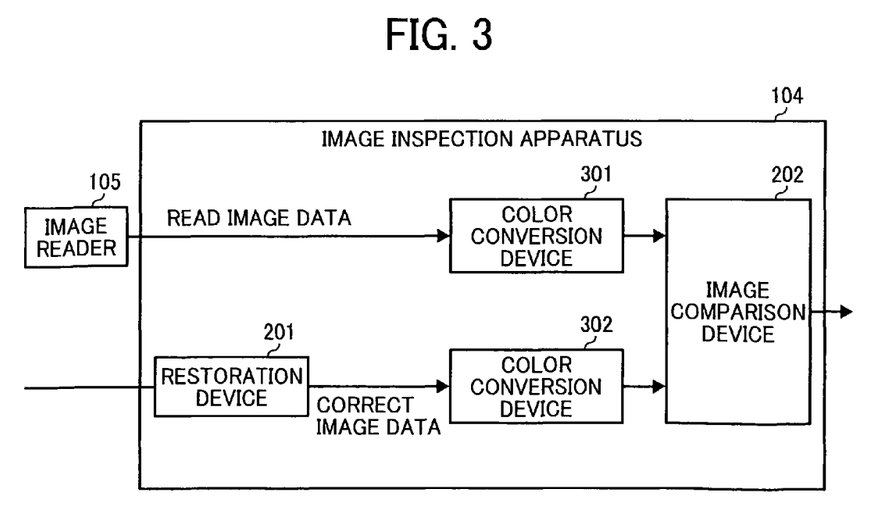
FIG. 3 is a block diagram illustrating a functional configuration of the image inspection apparatus according to a first variation of the first embodiment.

FIG. 3 is a block diagram illustrating a functional configuration of the image inspection apparatus 104 according to a first variation of the first embodiment shown in FIG. 3, the image inspection apparatus 104 according to the present variation mainly includes the restoration device 201, the image comparison device 202, a color conversion device 301, and a color conversion device 302. The restoration device 201 and the image comparison device 202 here have the same function and configuration as those in the first embodiment.

The color conversion device 301 converts read image data read by the image reader 105 into an image in a predetermined color space. The restoration device 201 converts RIP image data subjected to halftone processing, which is acquired from the printer 103, into correct image data, which is 8-bit data before being subjected to the halftone processing. Then, the color conversion device 302 performs a color conversion on the correct image data to be in the same color space as the image converted by the color conversion device 301. The image comparison device 202 compares the correct image data converted into the same color space with the read image data, and determines a print state of an image output medium.

In this manner, in the present variation, a print state of an image output medium is inspected by comparing correct image data converted into the same color space with read image data, and therefore it is possible to achieve a more highly accurate inspection.

Second Variation

In the first variation, correct image data is converted into the same color space as read image data by using the color conversion device 301 and the color conversion device 302. However, it is not necessary to use two color conversion devices. A comparison between two images can be made by converting one of the images to be in the same color space as the other image.

Figure 4:
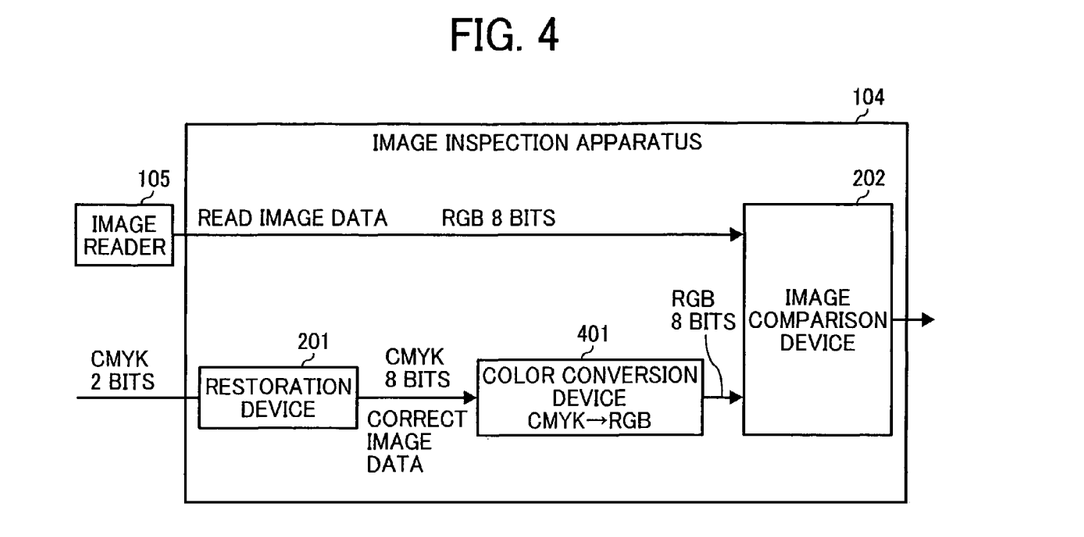
FIG. 4 is a block diagram illustrating a functional configuration of the image inspection apparatus according to a second variation of the first embodiment.

FIG. 4 is a block diagram illustrating a functional configuration of the image inspection apparatus 104 according to a second variation of the first embodiment. As shown in FIG. 4, the image inspection apparatus 104 according to the present variation mainly includes the restoration device 201, the image comparison device 202, and a color conversion device 401. The restoration device 201 and the image comparison device 202 here have the same function and configuration as those in the first embodiment.

The color conversion device 401 converts correct image data output from the restoration device 201 to be in the same color space as read image data read by the image reader 105. In this manner, in the present variation, the color space of correct image data is converted into the same color space as read image data read by the image reader 105, and then a comparison between the correct image data and the read image data is performed, so even a color image output device can perform an inspection of an image output medium.

More specifically, the color conversion device 401 performs the color conversion as follows. The read image data output from the image reader 105 is generally RGB image data. To make the image comparison device 202 compare correct image data with read image data, the color conversion device 401 according to the present variation converts the correct image data, a CMYK 8-bit image, output from the restoration device 201 from the CMYK color space to the RGB color space. The color conversion device 401 can be composed of a look-up table (LUT) which is a color conversion table for converting from CMYK to RGB, or can perform the color conversion by the arithmetic operation, such as the masking operation.

In this manner, in the present variation, even in the case of a general color printer and a general image reader, a comparison between correct image data and read image data can be made by a few conversion procedures, and the low-cost image inspection apparatus 104 can be constructed. Furthermore, in the present variation, as an inspection apparatus of a color image output device, the image inspection apparatus 104 performs an inspection of an image output medium by comparing images in the common color space, and therefore it is possible to achieve a more highly accurate inspection.

Third Variation

Figure 5:
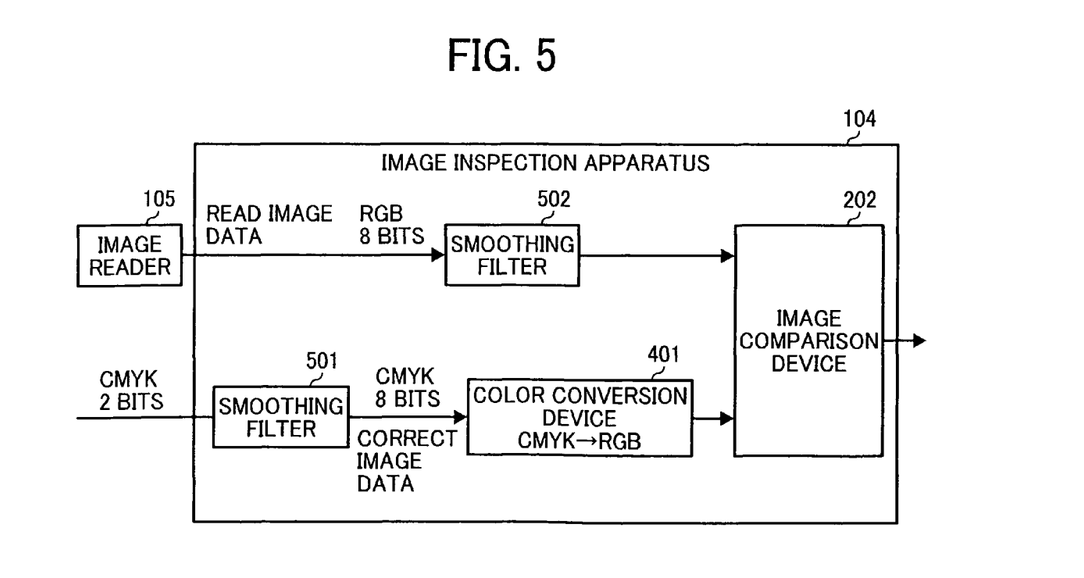
FIG. 5 is a block diagram illustrating a functional configuration of the image inspection apparatus according to a third variation of the first embodiment.

FIG. 5 is a block diagram illustrating a functional configuration of the image inspection apparatus 104 according to a third variation of the first embodiment. As shown in FIG. 5, the image inspection apparatus 104 according to the present variation mainly includes a smoothing filter 501 as a restoring unit, the image comparison device 202, the color conversion device 401, and a smoothing filter 502. The image comparison device 202 and the color conversion device 401 here have the same function and configuration as those in the second variation of the first embodiment.

As a method to restore an image subjected to halftone processing to an image before being subjected to the halftone processing, the simplest method to convert a 2-bit image subjected to halftone processing is to convert the pixel values of the 2-bit image as follows: 0 into 0, 1 into 86, 2 into 170, 3 into 255, for example. However, as described above, in this method, undulation due to a dither is left on the image subjected to the halftone processing, so if this image data is used as correct image data, it is difficult to compare the correct image data with read image data transmitted from the image reader 105.

Consequently, in the present variation, to smooth undulation due to a dither, an image subjected to halftone processing is filtered by the smoothing filter 501, and RIP image data obtained through the smoothing by the smoothing filter 501 is used as correct image data. The matrix size of the smoothing filter 501 is large enough to smooth dither.

On the other hand, if an output from the image reader 105 includes halftone dots of an image output medium as they are, it is necessary to smooth the halftone dots. Therefore, the output from the image reader 105 is subjected to smoothing by the smoothing filter 502.

In this manner, in the present variation, both when correct image data is generated and when read image data is input, the smoothing filters 501 and 502 are used as needed, and therefore it is possible to make a highly accurate comparison resistant to positional deviation, and also possible to achieve a more highly accurate inspection.

Second Embodiment

Figure 6:
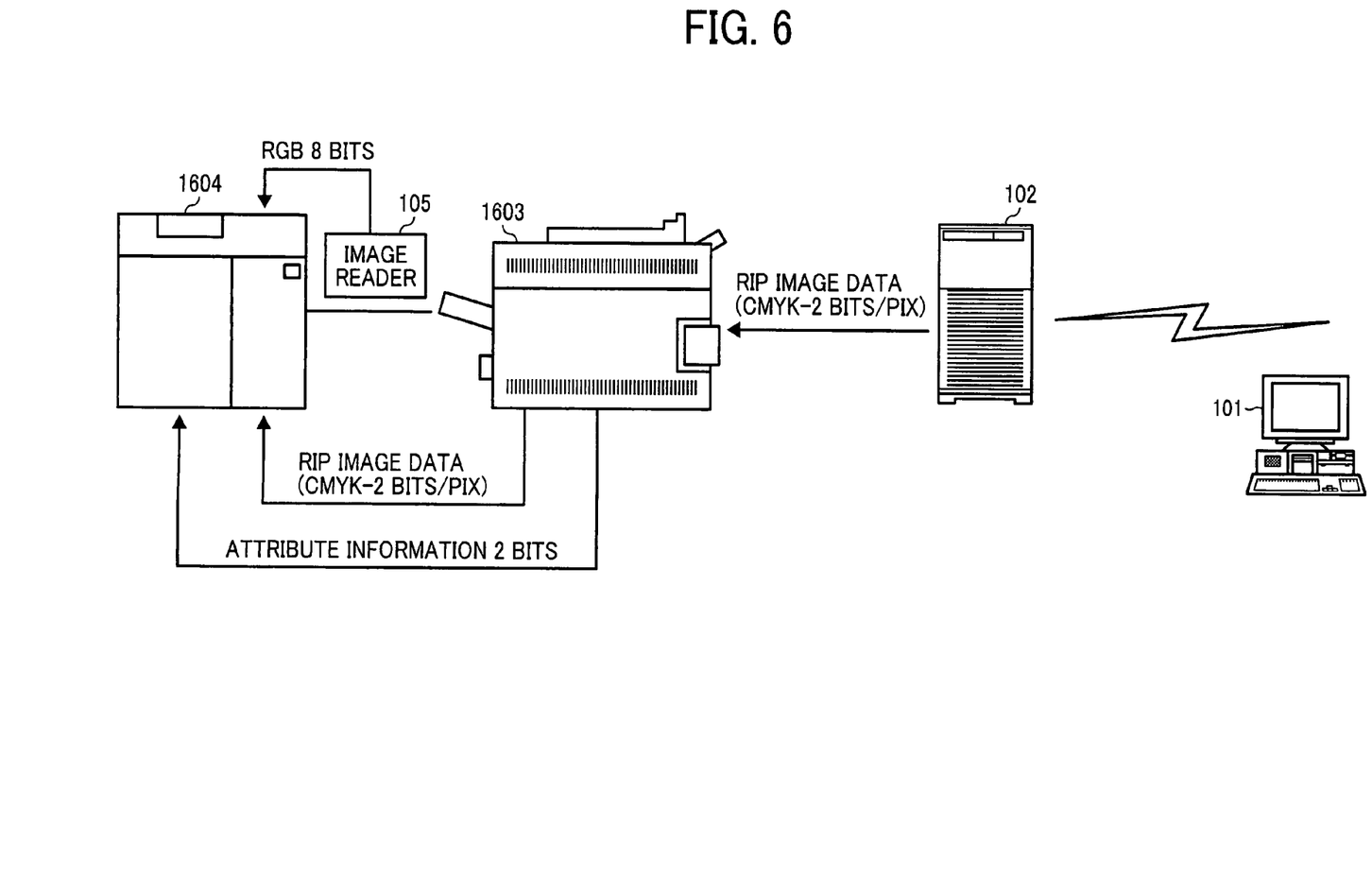
FIG. 6 is a configuration diagram of an image-output inspection system according to a second embodiment.

FIG. 6 is a configuration diagram of an image-output inspection system according to a second embodiment. As shown in FIG. 6, the image-output inspection system according to the present embodiment includes the client PC 101, the print server DFE 102 corresponding to a printer controller, a printer 1603 corresponding to an image output device, an image inspection apparatus 1604, and the image reader 105. The client PC 101, the print server DFE 102, the printer 1603, and the image inspection apparatus 1604 are connected to one another by a network. The image reader 105 is connected to the image inspection apparatus 1604 by wired or wireless connection. The client PC 101, the print server DFE 102, and the image reader 105 have the same function and configuration as those in the first embodiment.

The printer 1603 in the present embodiment differs from the printer 103 in the first embodiment in that the printer 1603 transmits attribute information of RIP image data together with the RIP image data to the image inspection apparatus 1604. Furthermore, the image inspection apparatus 1604 in the present embodiment differs from the image inspection apparatus 104 in the first embodiment in that the image inspection apparatus 1604 restores the RIP image data on the basis of the attribute information received from the printer 1603. The other functions of the printer 1603 and the image inspection apparatus 1604 are identical to those of the printer 103 and the image inspection apparatus 104 in the first embodiment.

The attribute information here means information for specifying that an object of RIP image data any of a text object, a graphic object, and an image object on a pixel-by-pixel basis. In the present embodiment, there are three objects of a text, graphic, and an image, so the attribute information is expressed in two bits. The number of bits can be determined depending on the system used.

Figure 7:
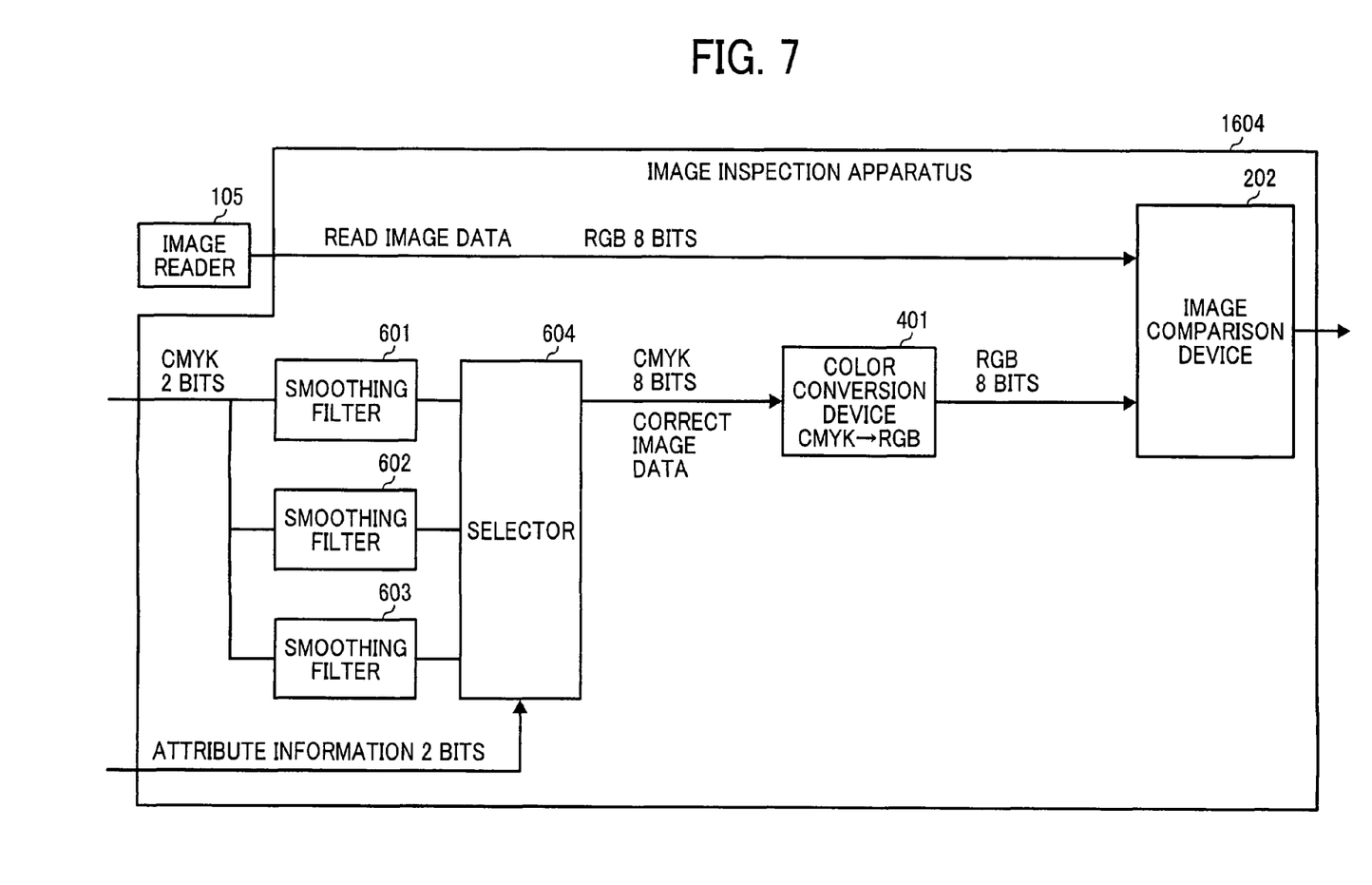
FIG. 7 is a block diagram illustrating a functional, configuration of an image inspection apparatus according to the second embodiment.

FIG. 7 is a block diagram illustrating a functional configuration of the image inspection apparatus 1604 according to the second embodiment. As shown in FIG. 7, the image inspection apparatus 1604 according to the present embodiment mainly includes smoothing filters 601, 602, and 603, a selector 604, the color conversion device 401, and the image comparison device 202. The image comparison device 202 has the same function and configuration as that in the first embodiment. The color conversion device 401 has the same function and configuration as that is in the second variation of the first embodiment.

The smoothing filter 601 performs smoothing for a text object on RIP image data. The smoothing filter 602 performs smoothing for a graphic object on the RIP image data. The smoothing filter 603 performs smoothing for an image object on the RIP image data. More specifically, the matrix size of the dither matrix used in the smoothing filter 601 for a text object is configured to be smaller than those used in the smoothing filters 602 and 603. Furthermore, the matrix size of the dither matrix used in the smoothing filter 602 for a graphic object is configured to be smaller than that is used in the smoothing filter 603 for an image object. This is because the text object has the highest number of lines per inch (LPI), the graphic object has the second highest number of LPI, and the image object has the lowest number of LPI.

The selector 604 receives attribute information of RIP image data from the printer 1603, selects any one of the smoothing filters 601 to 603 depending on content of the attribute information, and outputs the RIP image data smoothed by the selected smoothing filter as correct image data to the color conversion device 401. Namely, in the present embodiment, the smoothing filter for smoothing a dither is changed depending on attribute information. In FIG. 7, it is configured that any of outputs of the different smoothing filters is selected depending on attribute information. Used dithering and the LPI differ among types of objects, and therefore, a suitable smoothing filter used depending on the used dithering and the LPI.

Consequently, the smoothing filter 601 of the small matrix size is used with respect to a dither of a text object of which the number of LPI is high; this allows restoration to 8-bit multi-valued image data while keeping character outlines (edges). Furthermore, as for a graphic object of which the number of LPI is relatively low, an image object of which the number of LPI is lower than that of the graphic object, and the like, it is necessary to smooth undulation due to a dither with the smoothing filters 602 and 603 of which the matrix size is large.

In this manner, in the present embodiment, when correct image data for inspection is generated from RIP image data subjected to RIP, it is possible to obtain correct image data in which text portion is not washed out and a graphic or image (picture) portion is smooth, and therefore it is possible to carry out a highly accurate inspection.

First Variation

Figure 8:
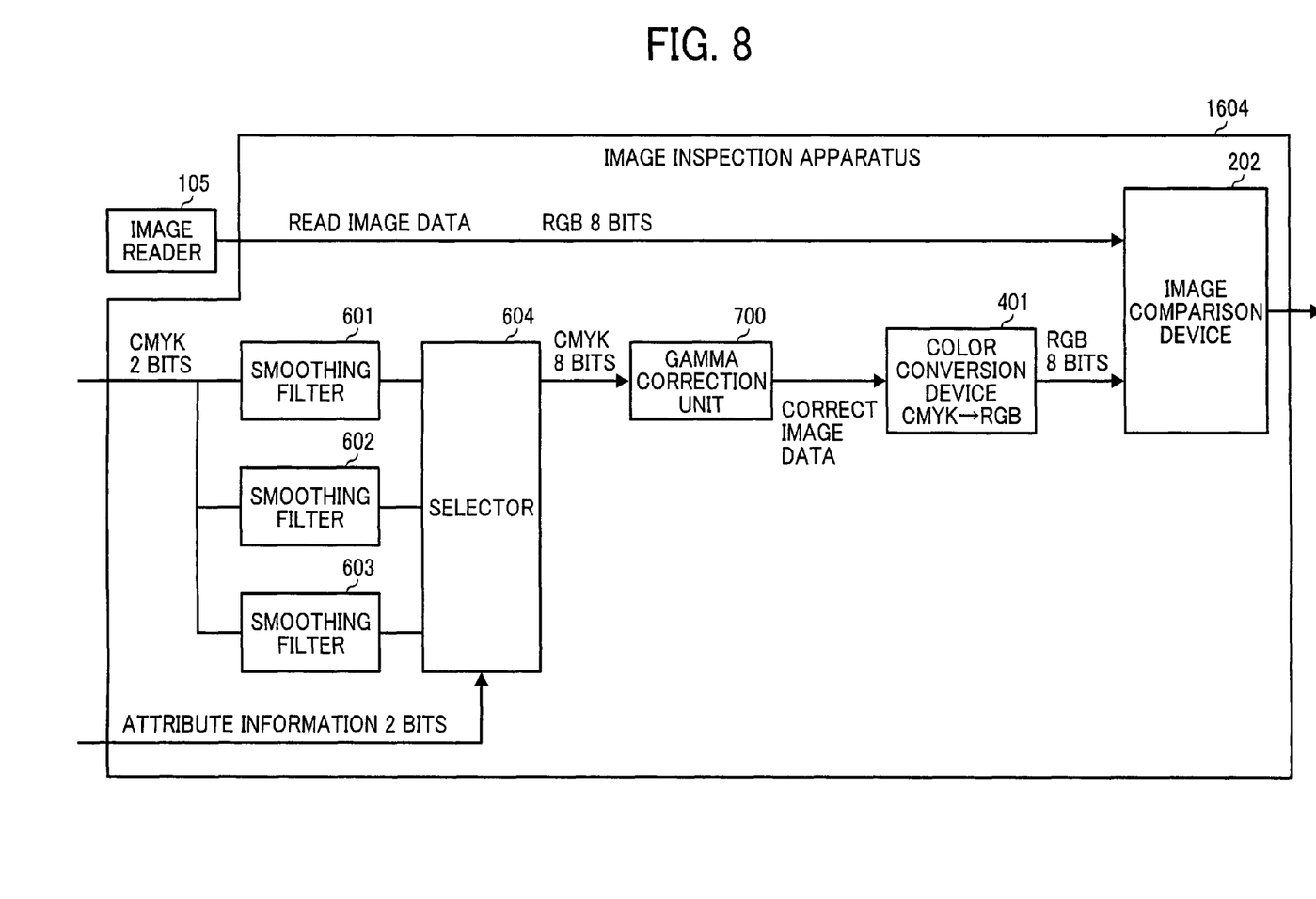
FIG. 8 is a block diagram illustrating a functional configuration of the image inspection apparatus according to a first variation of the second embodiment.

FIG. 8 is a block diagram illustrating a functional configuration of the image inspection apparatus 1604 according to a first variation of the second embodiment. As shown in FIG. 8, the image inspection apparatus 1604 according to the present variation mainly includes the smoothing filters 601, 602, and 603, the selector 604, a gamma correction unit 700, the color conversion device 401, and the image comparison device 202. The image comparison device 202 has the same function and configuration as that is in the first and second embodiments. The color conversion device 401 has the same function and configuration as that in the second variation of the first embodiment and the second embodiment. The smoothing filters 601 to 603 and the selector 604 have the same function and configuration as those in the second embodiment.

The gamma correction unit 700 according to the present embodiment performs a gamma correction on smoothed RIP image data output from the selector 604. When correct image data for inspection is generated from RIP image data subjected to RIP, the RIP image data is smoothed by any of the smoothing filters 601 to 603, thereby generating (restoring to) image data before being subjected to halftone processing. However, only by smoothing the RIP image data, the RIP image data may not be accurately restored to an original image. In this case, it is desirable to adjust the gradation by performing a gamma correction on the smoothed RIP image data.

Therefore, in the present variation, a gamma correction is performed on smoothed RIP image data, so even in the case where accurate values of correct image data cannot be obtained only by smoothing RIP image data, accurate correct image data can be obtained, and a print state of an image output medium is inspected by comparing the correct image data with read image data, and therefore it is possible to achieve a more highly accurate inspection.

Second Variation

Figure 9:
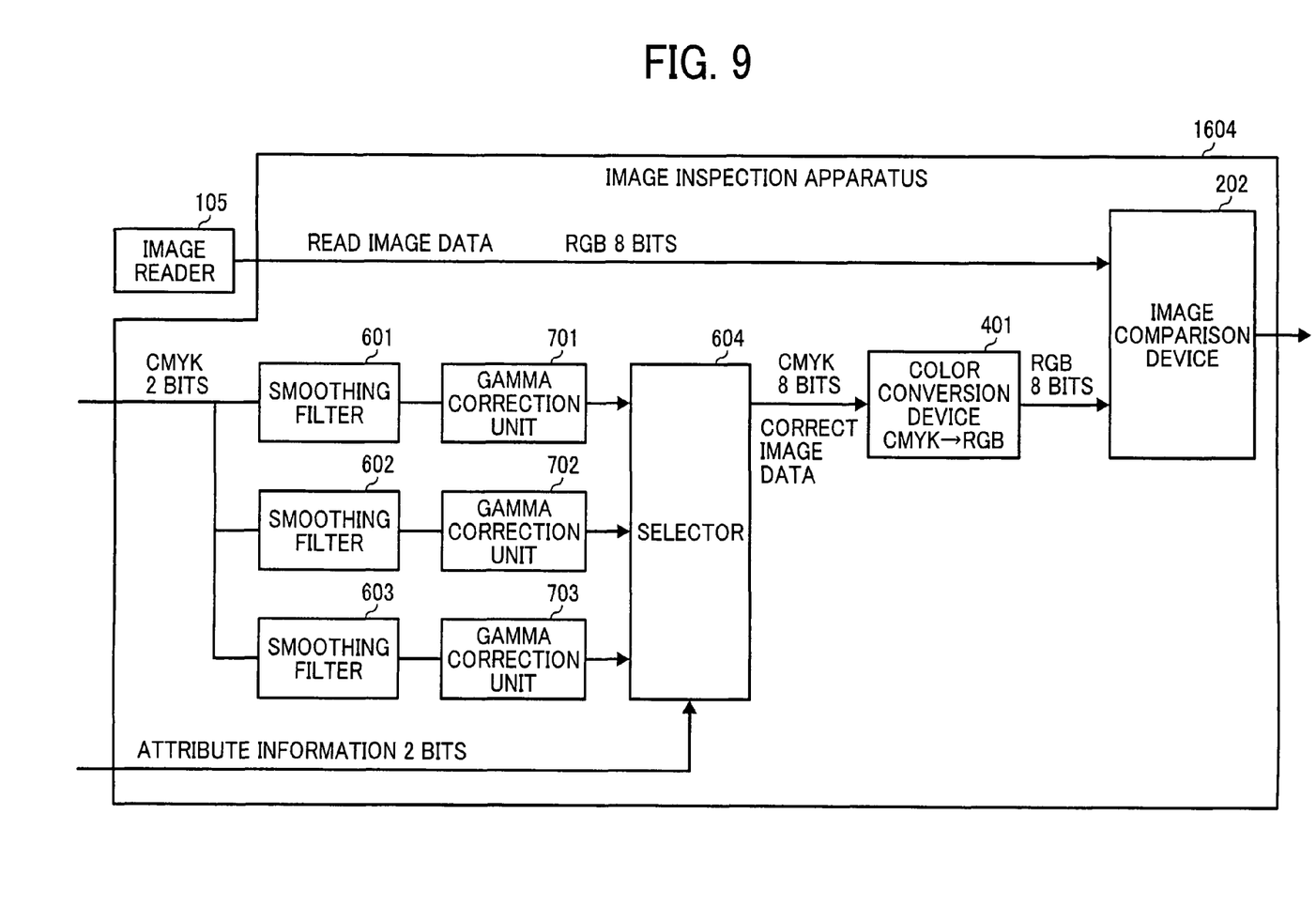
FIG. 9 is a block diagram illustrating a functional configuration of the image inspection apparatus according to a second variation of the second embodiment.

FIG. 9 is a block diagram illustrating a functional configuration of the image inspection apparatus 1604 according to a second variation of the second embodiment. As shown in FIG. 9, the image inspection apparatus 1604 according to the present variation mainly includes the smoothing filters 601, 602, and 603, gamma correction units 701, 702, and 703, the selector 604, the color conversion device 401, and the image comparison device 202. The image comparison device 202 has the same function and configuration as that in the first and second embodiments. The color conversion device 401 has the same function and configuration as that in the second variation of the first embodiment and the second embodiment. The smoothing filters 601 to 603 and the selector 604 have the same function and configuration as those in the second embodiment.

In the first variation of the second embodiment, a uniform gamma correction is performed regardless of a type of object of RIP image data; however, in this case, a problem may occur. This is due to the dot gain. Namely, when halftone dots are formed on an image output medium with a digitally equal area ratio between the low LPI area and the high LPI area, a dither in the high LPI area has the higher density due to the dot gain. This means when correct image data is generated by smoothing the RIP image data subjected to RIP, the density on an image output medium varies depending on the original LPI. Therefore, in the present variation, input/output characteristics of the gamma correction units 701 to 703 are adjusted depending on the original type of dither and LPI.

In this manner, in the present variation, a gamma correction is performed depending on the original type of dither and LPI, so with respect to any object having any LPI, correct image data can be generated with higher accuracy, and a print state of an image output medium is inspected by comparing the correct image data with read image data, and therefore it is possible to achieve a more highly accurate inspection.

Incidentally, in the image inspection apparatuses according to the first and second embodiments and the variations of these embodiments, the above-described devices and units can be realized by hardware, such as a circuit.

Furthermore, in the image inspection apparatuses according to the first and second embodiments and the variations of these embodiments, the above-described devices and units can be realized by an image inspection program. In this case, the image inspection program executed by the image inspection apparatuses according to the first and second embodiments and the variations of these embodiments is a computer-executable program written in legacy programming languages, such as assembler, C, C++, C#, and Java (registered trademark), and an object-oriented programming language, or the like. The image inspection program is stored in a ROM or the like in advance and provided.

The image inspection program executed by the image inspection apparatuses according to the first and second embodiments and the variations of these embodiments can be provided as a computer program product in such a manner that the image inspection program is stored in a computer-readable recording medium, such as a CD-ROM, a flexible disk (FD), a CD-R, or a digital versatile disk (DVD), in an installable or executable file format.

Furthermore, the image inspection program executed by the image inspection apparatuses according to the first and second embodiments and the variations of these embodiments can be provided in such a manner that the image inspection program is stored on a computer connected to a network, such as the Internet, so that a user can download the image inspection program via the network. Moreover, the image inspection program executed by the image inspection apparatuses according to the first and second embodiments and the variations of these embodiments can be provided or distributed via a network, such as the Internet.

The image inspection program executed by the image inspection apparatuses according to the first and second embodiments and the variations of these embodiments is composed of modules including the above-described units (the restoration device, the image comparison device, the color conversion device, and the like). A central processing unit (CPU), an actual hardware, reads out the image inspection program from the ROM, and executes the image inspection program, thereby the above-described units are loaded on a main storage unit, and the restoration device, the image comparison device, the color conversion device, and the like are formed on the main storage unit.

According to one aspect of the present invention, it is possible to perform an accurate inspection even when bitmap data with a small value subjected to halftone processing is transferred from a printer controller to a print output device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image-output inspection system comprising:
    a printer controller that generates output image data subjected to halftone processing in accordance with an input image forming condition specified in a printer language;
    an image output device that forms an image on an image output medium on the basis of the output image data, and transmits the output image data;
    an image reader that reads the image output medium, and generates read image data; and
    an image inspection apparatus that is connected to the image output device and receives the output image data from the image output device, and generates correct image data by restoring image data before subjected to the halftone processing from the output image data, and determines whether a print state of the image output medium is good or not by comparing the correct image data with the read image data.

2. An image inspection apparatus that is connected to an image output device, the image output device forming an image on an image output medium on the basis of output image data subjected to halftone processing in accordance with an input image forming condition specified in a printer language and transmitting the output image data, the image inspection apparatus comprising:
    a restoring unit that generates correct image data by restoring image data before subjected to the halftone processing from the output image data;
    an image comparing unit that determines whether a print state of the image output medium is good or not by comparing the correct image data with read image data generated by an image reader for reading the image output medium; and
    a first smoothing unit that performs smoothing on the read image data, wherein
    the restoring unit includes a second smoothing unit that performs smoothing on the correct image data, and the image comparing unit compares the correct image data subjected to the smoothing with the read image data subjected to the smoothing.

3. The image inspection apparatus according to claim 2, wherein a color space of the read image data and a color space of the correct image data are the same color space.

4. The image inspection apparatus according to claim 3, further comprising:
    a first color converting unit that converts the color space of the read image data into a predetermined color space; and
    a second color converting unit that converts the color space of the correct image data into the same color space as the predetermined color space, wherein
    the image comparing unit compares the correct image data and the read image data which are converted into the same color space.

5. The image inspection apparatus according to claim 3, further comprising a color converting unit that converts the color space of the correct image data into the same color space as the read image data, wherein
    the image comparing unit compares the correct image data subjected to color conversion with the read image data.

6. The image inspection apparatus according to claim 5, wherein
    the read image data is RGB data,
    the correct image data is CMYK data, and
    the color converting unit performs a color conversion of the CMYK data into RGB data.

7. The image inspection apparatus according to claim 2, wherein
    the restoring unit includes:
    a plurality of smoothing units that perform smoothing on the image data subjected to the halftone processing; and
    a selecting unit that selects a smoothing unit from the plurality of smoothing units on the basis of attribute information indicating attribute of each pixel of the image data, and the image comparing unit compares the image data subjected to smoothing by the selected smoothing unit as correct image data with the read image data.

8. The image inspection apparatus according to claim 7, further comprising a gamma correction unit that performs a gamma correction on the image data subjected to the smoothing by the selected smoothing unit, wherein the image comparing unit compares the image data subjected to the gamma correction as the correct image data with the read image data.

9. The image inspection apparatus according to claim 7, further comprising a plurality of gamma correction units that are provided to correspond to the plurality of smoothing units and perform different gamma corrections from one another on the image data subjected to smoothing, wherein the selecting unit selects a gamma correction unit from the plurality of gamma correction units on the basis of the attribute information.

10. The image inspection apparatus according to claim 7, wherein the attribute information is received from the image output device.

11. The image inspection apparatus according to claim 7, wherein the attribute information indicates that the image data is any of a text object, a graphic object, and an image object, and the plurality of smoothing units are provided to correspond to the text object, the graphic object, and the image object.

12. The image inspection apparatus according to claim 11, wherein respective dither matrix sizes of the plurality of smoothing units are set to be smaller in order of the smoothing unit for the text object, the smoothing unit for the graphic object, and the smoothing unit for the image object.

13. A computer program product comprising a non-transitory computer-readable medium having computer-readable program codes embodied in the medium for causing a computer connected to an image output device, which forms an image on an image output medium on the basis of output image data subjected to halftone processing in accordance with an input image forming condition specified in a printer language and transmits the output image data, to execute:

generating correct image data by restoring image data before subjected to the halftone processing from the output image data;

determining whether a print state of the image output medium is good or not by comparing the correct image data with read image data generated by an image reader for reading the image output medium;

performing a first smoothing on the read image data;

performing a second smoothing on the correct image data; and comparing the correct image data subjected to the smoothing with the read image data subjected to the smoothing.

* * * * *